United States Patent
Montgomery et al.

(10) Patent No.: US 7,392,404 B2
(45) Date of Patent: Jun. 24, 2008

(54) ENHANCING DATA INTEGRITY AND SECURITY IN A PROCESSOR-BASED SYSTEM

(75) Inventors: Michael A. Montgomery, Cedar Park, TX (US); Anshuman Sinha, Houston, TX (US); Danny Kumamoto, Cedar Park, TX (US)

(73) Assignee: Gemalto, Inc.

( * ) Notice: Subject to any disclaimer, the term of this patent is extended or adjusted under 35 U.S.C. 154(b) by 806 days.

(21) Appl. No.: 10/327,626

(22) Filed: Dec. 20, 2002

(65) Prior Publication Data

US 2004/0123132 A1 Jun. 24, 2004

(51) Int. Cl.
    *G06F 11/30* (2006.01)
(52) U.S. Cl. ............... 713/194; 713/193; 726/22; 726/23; 726/26; 726/27; 710/8; 710/10; 710/105
(58) Field of Classification Search ........... 713/169, 713/194, 193; 714/718; 726/27, 2, 22, 23, 726/26; 710/105, 8, 10; 711/118
    See application file for complete search history.

(56) References Cited

U.S. PATENT DOCUMENTS

| | | | |
|---|---|---|---|
| 5,742,756 A | 4/1998 | Dillaway et al. | |
| 5,873,114 A * | 2/1999 | Rahman et al. | 711/106 |
| 6,157,966 A * | 12/2000 | Montgomery et al. | 710/8 |
| 6,175,896 B1 * | 1/2001 | Bui | 711/118 |
| 6,250,557 B1 | 6/2001 | Forslund et al. | |
| 6,385,727 B1 * | 5/2002 | Cassagnol et al. | 713/193 |
| 6,434,238 B1 | 8/2002 | Chaum et al. | |
| 6,971,051 B2 * | 11/2005 | Taylor et al. | 714/718 |
| 7,058,065 B2 * | 6/2006 | Musoll et al. | 370/395.7 |
| 7,130,942 B2 * | 10/2006 | Gemelli et al. | 710/105 |
| 2001/0000814 A1 * | 5/2001 | Montgomery et al. | 710/10 |
| 2003/0009615 A1 * | 1/2003 | Hsu et al. | 711/104 |
| 2003/0131291 A1 * | 7/2003 | Morrison et al. | 714/54 |
| 2004/0083375 A1 * | 4/2004 | Foster et al. | 713/189 |

* cited by examiner

*Primary Examiner*—Nasser Moazzami
*Assistant Examiner*—Shanto M Abedin
(74) *Attorney, Agent, or Firm*—Pehr Jansson; The Jansson Firm (57) ABSTRACT

A smart card which includes a non-volatile read/write memory and a processor connected to the memory, and further configured to cause the processor to perform a method for enhancing data security and managing the contents of memory during periods when the computational power of the processor is underutilized. The method includes steps for determining if a command or character has been received, processing and/or responding to the command or character once received, implementing a security measure and/or managing memory, and performing a tamper protocol in response to detecting a security breach, all of which is performed while waiting to receive the next command or character.

27 Claims, 8 Drawing Sheets

ENHANCING DATA INTEGRITY AND SECURITY IN A PROCESSOR-BASED SYSTEM

FIELD OF PRESENT INVENTION

The present invention generally relates to the field of processor-based systems; and more particularly, to an improved method and apparatus for enhancing data integrity and security in processor-based systems having limited application execution time.

HISTORY OF RELATED ART

Certain data processing systems (also referred to herein as "systems") typically have a high security requirement. Generally, such systems employ various security measures designed to help secure the systems against tampering and the unauthorized extraction of data. The additional execution time associated with such security measures, however, must typically be balanced against the overall time and system resources available for execution of applications.

Examples of such systems include embedded systems and smart cards. Smart cards are used for a variety of applications, including storing private data like personal identification numbers (PIN), cryptographic keys, electronic cash, medical records, bank records, on-line logins and passwords, social security numbers, credit card information, automated teller machine (ATM) account information, or the like. Smart cards are typically encased in a tamper-resistant, plastic or metal housing about the size of a credit card. Smart cards also typically contain one or more embedded integrated circuit devices (such as a processor) and embedded memory to communicate with a terminal such as an identification (ID) verification system and the like. Terminals are available with one or more smart card interfaces that facilitate coupling the smart card to the terminal.

Typically, because of the fields in which they are utilized, smart cards are under threat of being attacked by external sources that could be used to tamper with or corrupt the contents of the smart card's memory. Tampering with the contents of the memory may cause a denial of service for the smart card holder and/or may facilitate malicious reprogramming of applications residing on the smart card so as to provide unauthorized access to private data residing on the card.

In addition to the security threats, there is a strong likelihood that the re-programmable memory portion of a system will become fragmented—thereby, increasing the latency to access the data. In particular, smart cards with embedded re-programmable memory generally possess the capability to store an application for the smart card (i.e., applet) and then later delete the applet. When the memory is inefficiently handled and/or begins to reach capacity, applets are likely stored in more than one fragment in discontinuous units of memory. As further applets are stored, applets may become even more fragmented, leaving holes in the content of the memory and reducing the efficiency with which the data is handled.

Certain systems (such as smart cards) are generally constrained on the time and system resources they can employ to address data integrity and security issues. For example, because of the required interaction with a terminal, application execution time is typically limited to the duration of the terminal contact for systems such as smart cards. Accordingly, it would be beneficial to implement an apparatus and method for the efficient enhancement of data integrity and security within a system having limited application execution time.

BRIEF DESCRIPTION OF THE DRAWINGS

The structure and operation of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed. On the contrary, the invention is limited only by the claim language.

DETAILED DESCRIPTION OF EMBODIMENTS

Generally speaking the present invention contemplates an improved method and apparatus for efficiently enhancing data integrity and security within a resource constrained system without increasing overall system execution time or resources by implementing security and data integrity measures during wait or idle cycles of communication. Wait cycles are cycles wherein the applicable port protocol does not utilize or under utilizes the computational power of the system's processor. Thus, embodiments of the present invention take advantage of the computational power of the system's processor by implementing a security measure during a wait cycle of a port protocol to determine if applicable data has been tampered with and executing a tamper protocol in response to a determination of tampering. The implemented security measure may perform security or data integrity checks on a content of the memory to monitor the content for signs of tampering. Alternative embodiments of the invention also take advantage of the computational power of the system's processor by managing the system's memory during a wait cycle to reduce fragmentation, and thereby, enhance system performance. Throughout the description and the drawings, elements which are the same will be accorded the same reference numerals.

Figure 1:
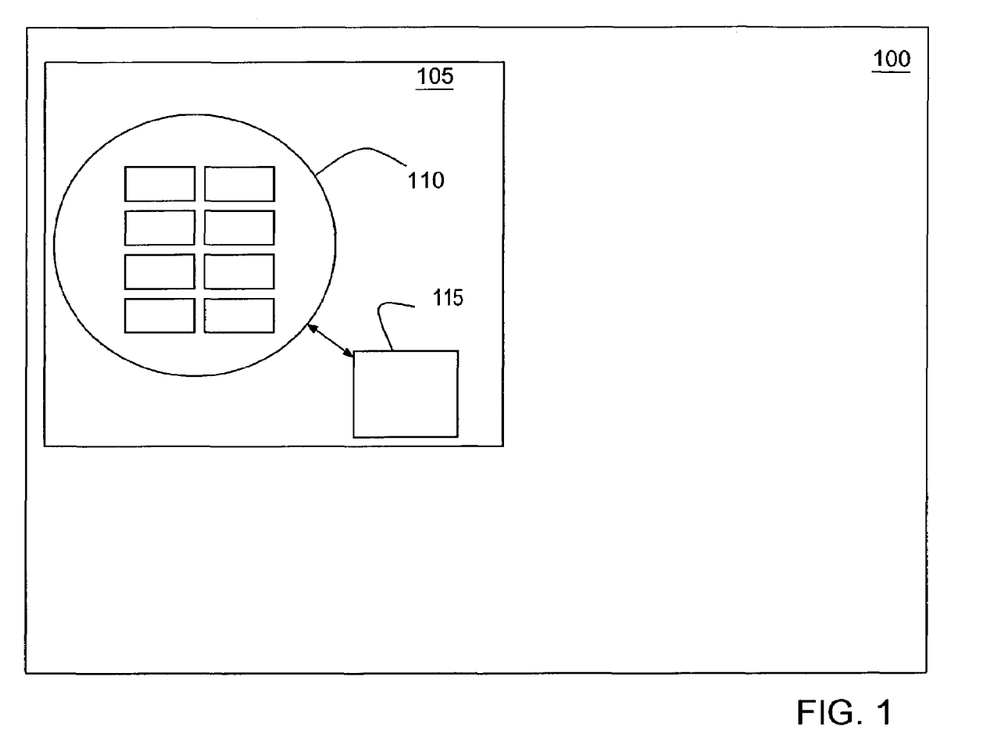
FIG. 1 conceptually depicts an exemplary smart card.

FIG. 1 shows an exemplary smart card. Smart card 100 is roughly the size of a credit card and includes a module 105 with conductive contacts 110 connected to a microprocessor with an integral memory element 115. Conductive contacts 110 interface with a terminal to typically provide operating power and to electrically transfer data between the terminal and the smart card. Other embodiments of a smart card may not include conductive contacts 110. Such "contactless" smart cards typically exchange information and receive power via proximately coupling, such as magnetic coupling, or via remote coupling, such as radio communication. Smart card 100 is compliant with Standard 7816 Parts 1-10 of the International Organization for Standardization (ISO), which is incorporated by reference herein and referred to generally as "ISO 7816."

Figure 2:
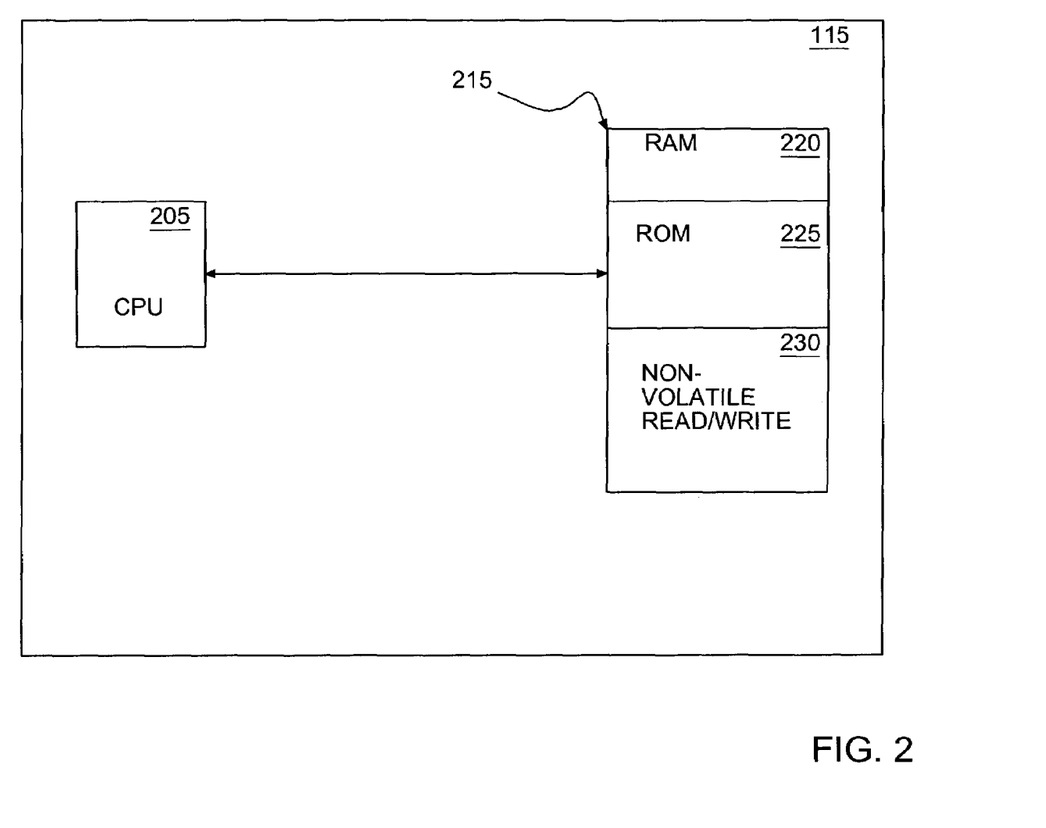
FIG. 2 conceptually illustrates the microprocessor with integral memory element 115 portion of module 105 of the exemplary smart card of FIG. 1 in some additional detail.

The microprocessor with an integral memory element 115 of FIG. 1 is shown in additional detail in FIG. 2. Microprocessor 115 includes central processing-unit (CPU) 205. Microprocessor 115 is associated with a memory element 215. The "memory" may be formed on the same integrated circuit as microprocessor 115 or may be formed on a separate device.

Generally, memory element 215 is configured to include random access memory (RAM) 220, read only memory (ROM) 225, and non-volatile read/write memory 230. In an alternative configuration, RAM 220, ROM 225, and non-volatile read/write memory 230 are not located in the same memory element 215, but rather, in some combination of separate electronic units.

Figure 3:
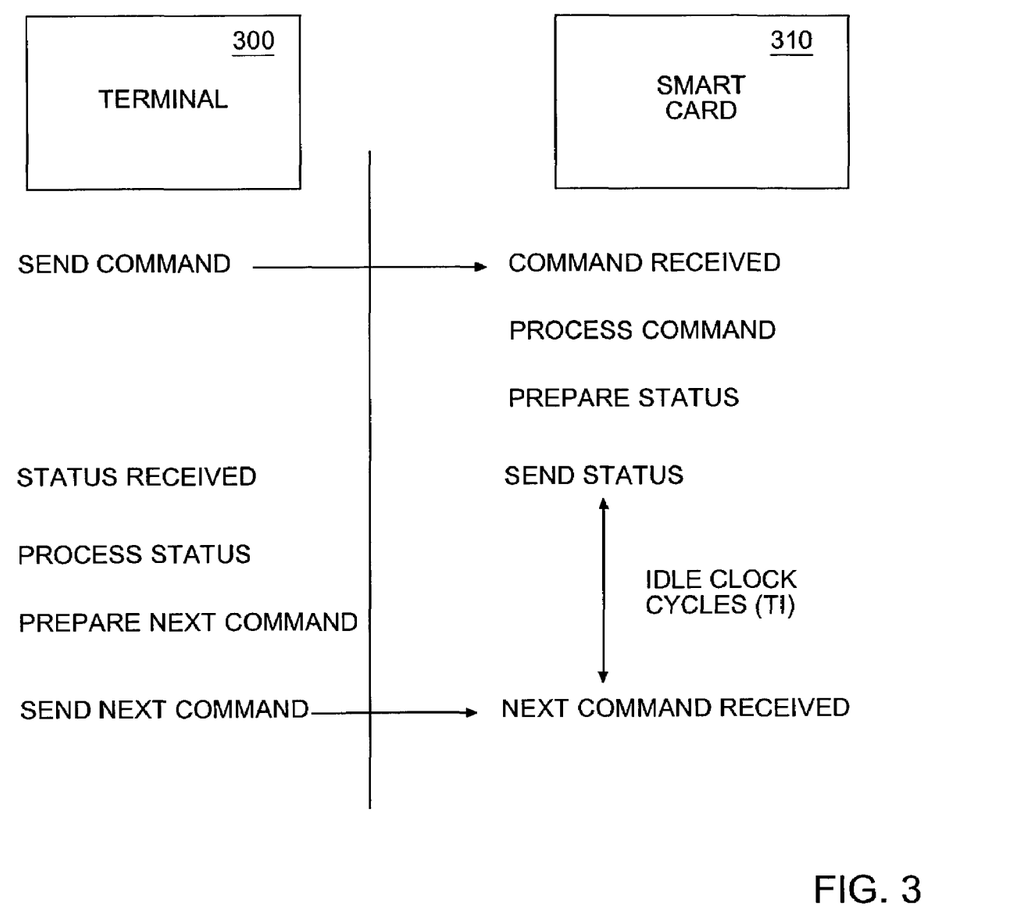
FIG. 3 conceptually depicts an interaction between a smart card and a terminal.

FIG. 3 depicts an interaction between a terminal 300 and a smart card 310. Smart card 310 is inserted into terminal 300 to perform a transaction such as a transaction to manage a fund of stocks, bonds, mutual funds, and the like. As noted above, terminal 300 typically provides smart card 310 with operating power and serves to electrically transfer data between terminal 300 and smart card 310. With respect to data transfer, generally, port protocols such as ISO 7816 facilitate communication by organizing transactions between devices such as terminal 300 and smart card 310.

More specifically, from the standpoint of terminal 300, the communication model of such a port protocol is to send a message/command (generally referred to as an Application Protocol Data Unit (APDU) for smart cards) and wait for a response from the receiving device (smart card 310, as depicted in FIG. 3). Terminal 300 typically includes a card acceptance device (CAD) having a port protocol such as ISO 7816 to receive smart card 310. Terminal 300 typically transmits an APDU. Smart card 310 receives the APDU, processes the APDU, prepares a status, and responds to terminal 300 with the status via a corresponding port protocol configured to transact with the port protocol of terminal 300.

After receiving a response from smart card 310, terminal 300 may expend cycles to process the status and prepare a subsequent APDU. While terminal 300 is processing the status and preparing a subsequent APDU, terminal 300 may not transact with smart card 310 for a period of time so that smart card 310 is idle for this period of time. Examples of this idle time (referred to hereinafter as "idle time" or "wait cycles") include the idle time that occurs when receiving a series of messages/commands (APDUs in the case of smart cards) and the idle time that occurs when receiving a series of individual characters. For example, after receiving an APDU or character, smart card 310 typically waits a number of cycles before receiving an interrupt to read the next APDU or character. During these wait cycles, typically little is accomplished other than to ensure that the interrupt being monitored is detected quickly.

Figure 4:
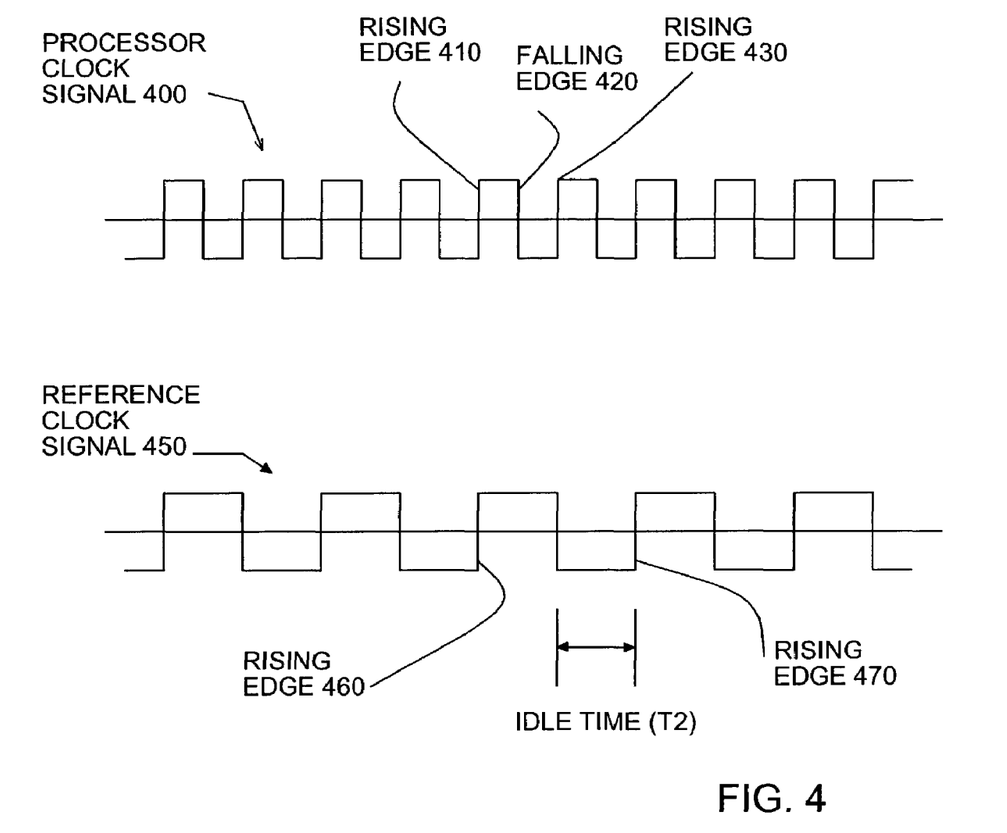
FIG. 4 conceptually illustrates wait cycles associated with a port protocol.
Figure 5:
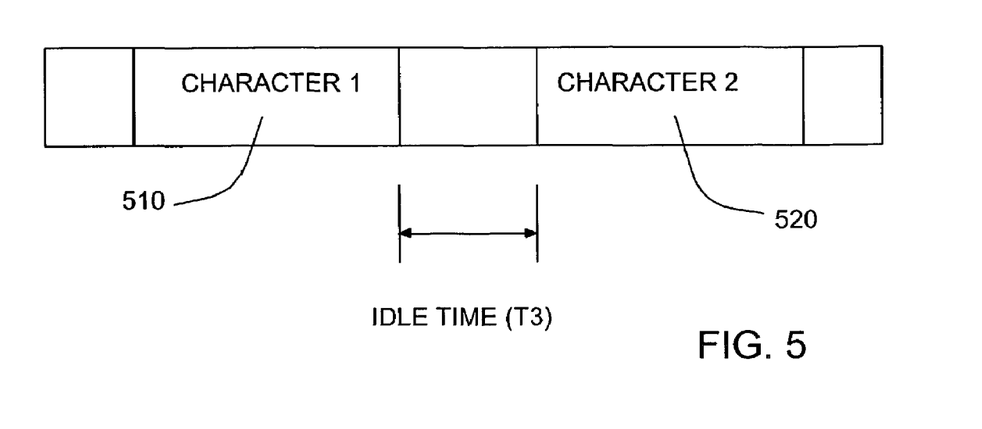
FIG. 5 further conceptually illustrates wait cycles associated with a port protocol.

FIGS. 4 and 5 illustrate wait cycles discussed in FIG. 3 above. Specifically, FIG. 4 describes an embodiment wherein processor clock signal 400 operates at twice the speed of the reference clock signal 450. In such embodiments, a port protocol may process transaction signals at the rising edge of reference clock signal 450, such as rising edges 460 and 470. As a result, the smart card may realize one or two wait cycles for each cycle of the port protocol. For example, the smart card may operate on the rising edges and falling edges of processor clock signal 400, such as rising edges 410 and 430 and falling edge 420.

Thus, during idle time, one embodiment of the present invention implements a security measure and/or memory management measure at rising edge 410 and falling edge 420 during a transaction with a terminal. Similarly, between transmission of commands and characters of commands, one embodiment of the present invention implements the security measure and/or memory measurement measure at the rate of two or four times the speed of the port protocol depending upon whether the processor of the smart card operates on rising edges, falling edges, or both rising and falling edges of processor clock signal 400. In alternative embodiments of the present invention, processor clock signal 400 may operate at different multiples of reference clock signal 450.

FIG. 5 depicts the wait cycles of a port protocol with respect to transmission of characters of a command. The port protocol may receive character one 510 and wait cycles equivalent to idle clock cycles (T3) before receiving character two of the command 520. During wait cycles (T3), one embodiment of the present invention implements a security measure algorithm, memory management algorithm, and/or tamper protocol algorithm to enhance the security of data stored in memory associated with a processor such as a microcontroller or microprocessor.

Figure 6:
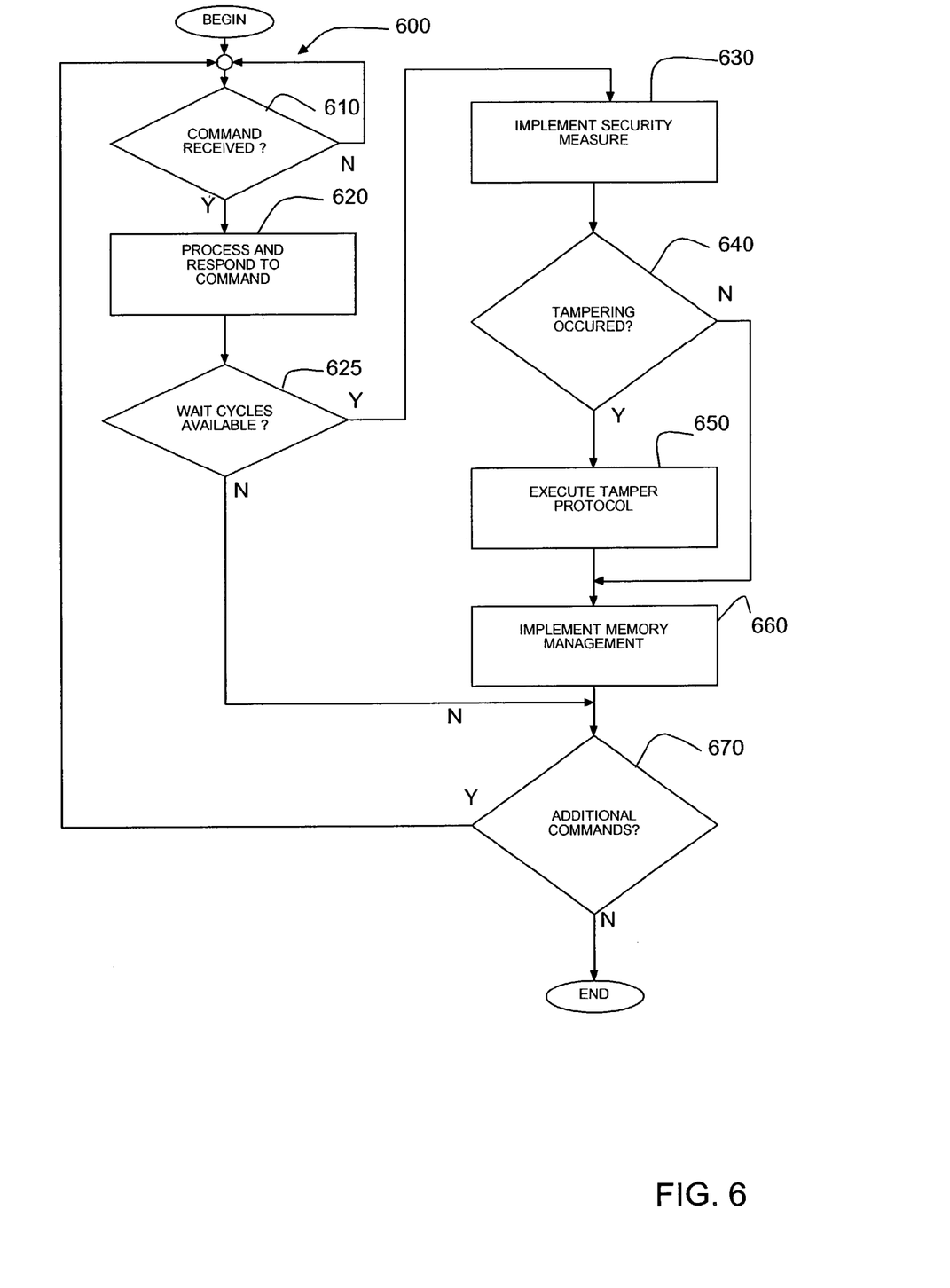
FIG. 6 depicts a flow chart of one embodiment of the present invention to implement a security measure during wait or idle cycles of communication.

FIG. 6 depicts a flow chart of an embodiment of the present invention which implements security and memory management measure 600 during wait cycles or idle time to enhance data security and/or manage memory. The embodiment generally involves determining if a command or character has been received, processing and/or responding to the command or character once received, implementing a security measure and/or managing memory while waiting to receive the next command or character, and performing a tamper protocol in response to detecting a security breach.

Alternative embodiments included receiving and storing data and may further include encoding the data with a security key and storing the encoded data. In many of these embodiments, storing the encoded data involves storing the encoded data and the key in non-volatile read/write memory to process subsequent transactions. For example, one embodiment of the invention involves an automated teller machine (ATM) card. Prior to receiving the card from a bank, a cardholder may provide the bank with personal data and the personal data may include private data such as a PIN. The ATM card is seated in a programming terminal and the personal data is transferred to the card. A processor imbedded in the card receives the data and generates an encoder key, such as a private key. In several of these embodiments, part or all of the personal data is encrypted with the encoder key.

In one embodiment of the invention, determining a key based upon the data includes generating a checksum based upon the data to facilitate monitoring the data for single bit and multiple bit errors. For instance, data received by a smart card may comprise personal data as well as updates to algorithms like command processing algorithms. One or more checksums may be generated for the data and for the command processing algorithms based upon the type of data and/or based upon units of memory. The checksum(s) may then be stored in memory. If tampering occurs, the checksum(s) of the original data and algorithm(s) will generally not match the checksum(s) of the data and algorithm(s) stored in the memory.

Determining if a command or character has been received (block 610) may include initializing a port like a port of a smart card for processing a transaction and may also include loading protocol variables and, in some embodiments, security variables like the encoder key, from non-volatile, read/write memory into a buffer. Loading protocol variables may include loading a frequency factor (FI) and a delay factor (DI) for a communication based upon the speed of the communication such as defined in ISO 7816.

In response to determining that a command or character has been received, processing and responding to the command/character (block 620) determines the appropriate response to the command/character based upon the contents of memory and transmits the response. In response to determining that wait cycles are available (block 625), security measure (block 630) is implemented. Security measure (block 630) may include performing operations to enhance data security checks such as performing security checks on the data and/or firmware algorithms. If wait cycles are not available (block 625), then a determination is made as to whether additional commands and/or characters are available (block 670).

A person skilled in the art will appreciate that the nature of the security check may depend upon the key generated. For example, in one embodiment of the present invention, security checks are performed by a bit-wise logical XOR operation with the initial value of the checksum on the original data. Other embodiments of the invention implement cryptographic and data integrity algorithms like cyclic redundancy check (CRC) and data encryption standard (DES) encryption or incorporate a security policy that determines the security checks to implement and generates a new key to facilitate these security checks.

In response to determining that tampering has occurred (block 640), tamper protocol (block 650) is effected. Since the nature of the tampering may be unknown, many embodiments of the invention will disable the port protocol. For example, the port protocol may be designed to facilitate access to the private data by input-output (I/O) devices like a transaction terminal. In these situations, disabling the port protocol substantially prevents further interaction with the I/O devices. Other embodiments of the invention provide a protocol for communication with master devices such as a programming terminal to communicate that tampering has occurred and to facilitate recovery of the data or enablement of the port protocol or a new port protocol. Still additional embodiments will clear the contents of the memory or erase the private data from the memory in response to a determination of tampering.

Implementing memory management (block 660) may perform memory management functions such as removal of data and/or algorithms for which there is no clear command interface defined and may also involve defragmentation of the data. For example, entering new data and/or replacing old data may cause fragmentation if insufficient contiguous space is available. The fragmented data may affect the speed with which commands and security checks are processed. However, performing memory management functions in accordance with the invention advantageously reduces the fragments, potentially to a single unit of data, without substantial demand, if any, on cycles designated for communication. If additional commands and/or characters are available (block 670), the process is once again performed.

A person skilled in the art will appreciate that each of implement security measure (block 630), determine that tampering has occurred (block 640), execute tamper protocol (block 650), and implement memory management (block 660) may be interrupted at any time upon the receipt of a command and/or character. Accordingly, one embodiment of the present invention will (at the time of such interruption) set a flag or other indicator to designate whether the applicable security measure or memory management measure completed in order to permit the orderly continuation or recurrence of the security measure and/or memory management measure during subsequently available wait cycles. Other embodiments may (at the time of such interruption) store applicable values in memory so as to permit the orderly continuation of the security measure and/or memory management measure.

In those embodiments where a fixed time period may be employed between receipt of each command and/or character, the port protocol may define the applicable fixed number of cycles between the commands and/or characters. In those embodiments, implementation of security measure (block 630), determining that tampering has occurred (block 640), executing tamper protocol (block 650), and implementing memory management (block 660) is dependent upon the number of wait cycles available in accordance with the port protocol and the speed of the transmission. For example, a device such as a smart card may determine protocol variables, such as FI and DI, after insertion of a smart card into a terminal. The parameters are copied into a buffer of the smart card and the number of cycles available to implement a security measure may be based upon the selected variables. In those instances, embodiments of the invention accommodate the timing by determining the number of cycles to implement a security measure or to manage the memory. Several of these embodiments also determine the clock speed of a processor to implement the security measure and/or manage memory as a multiple of the clock speed associated with the terminal.

Figure 7:
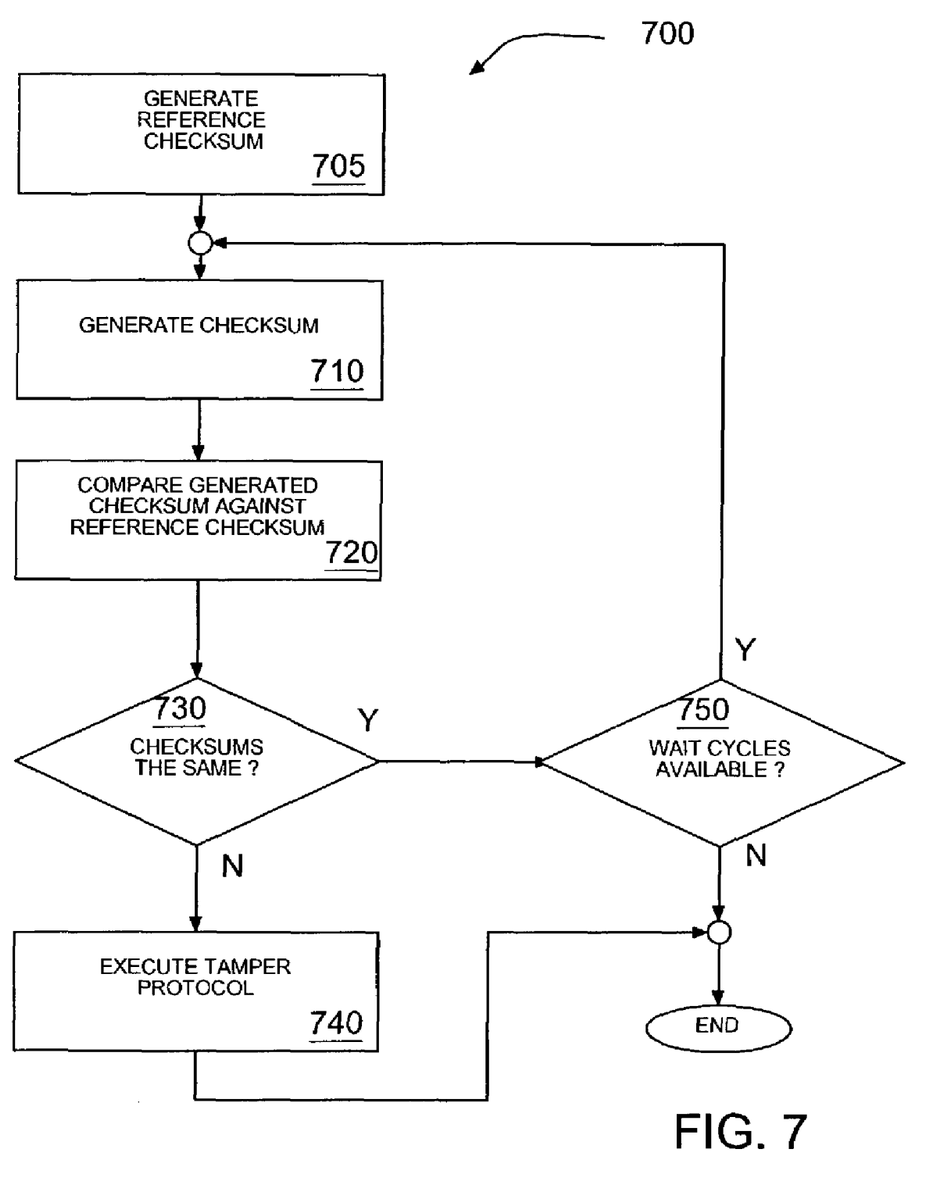
FIG. 7 depicts a flow chart of one embodiment of the security measure depicted in FIG. 6.

FIG. 7 depicts a flow chart of a security measure (block 630) implemented in one embodiment of the present invention. The security measure performs a bit-wise logical XOR operation with the initial value of the checksum on the original data. The checksum is the key determined in this embodiment when the data was received and stored in block 610 of FIG. 6. Security measure (700) includes generating and storing a reference checksum (block 705), a checksum for a unit of the memory (block 710), comparing the initial value of the reference checksum to the generated checksum (block 720), executing a tamper protocol (block 740) if the checksums are not the same (block 730), and determining whether sufficient cycles remain to perform a security check on another unit of data (block 750).

Generating the reference checksum for the original data and each subsequent generating of a checksum for a unit of the memory (blocks 705 and 710) involve generating a checksum for data that may be vulnerable to corruption or tampering. In some embodiments, the data (such as private data) may be encoded prior to determining the initial value of the checksum and the data may be stored as encoded data. In one embodiment of the invention, private data may include sensitive data such as a card status byte of an electrically erasable programmable read only memory (EEPROM) of a smart card. For instance, the value of the card status byte, being stored in EEPROM, may bind the security policy of the smart card with the state of the card. The card status byte, however, may be vulnerable to electron beam scrambling or a software glitch that could lessen the security policy, and thereby, providing hackers easier access. For example, if the smart card is performing a transaction that warrants heavy security according to the security policy wherein several forms of identity are authenticated and verified to identify a user as the owner of the contents of the smart card and a hacker is able to modify the state of the security policy to an initial state having minimal security, the security policy may assert minimal security measures to authenticate and verify the data offered to provide access by the hacker to the private data of the card.

Comparing the checksum to a reference checksum (block 720) involves determining whether a bit has changed since the original version of the data was stored. Those skilled in the art, will appreciate that an advantage of the checksum is that a significant percentage of bit changes may be detected with little overhead in terms of cycles and memory as compared with other types of detection. Further, the checksum can be used in conjunction with encoding.

Executing a tamper protocol (block 740) may be configured to prevent an improper access to private data, wherein the improper access is facilitated by tampering with memory. For example, in one embodiment of the present invention, executing a tamper protocol (block 740) may erase the key to decode data stored in memory and then may erase the data. In alternative embodiments, wherein the memory may be integrated with the processor, executing a tamper protocol (block 740) includes disabling a port protocol.

Determining whether sufficient cycles remain to perform a security check on another unit of data (block 750) may provide a loop that repeats a number of times based upon the cycles expended by the loop and the number of available cycles between response to a command and receipt of a subsequent command, or between receipt of characters of a command. In one embodiment of the present invention, the allocation of cycles to the security measure may be balanced with an allocation of cycles to memory management and be responsive to the state that a security policy asserts. For instance, when the security policy asserts minimal security, cycles may be allocated to memory management or more cycles may be allocated to memory management than security.

Figure 8:
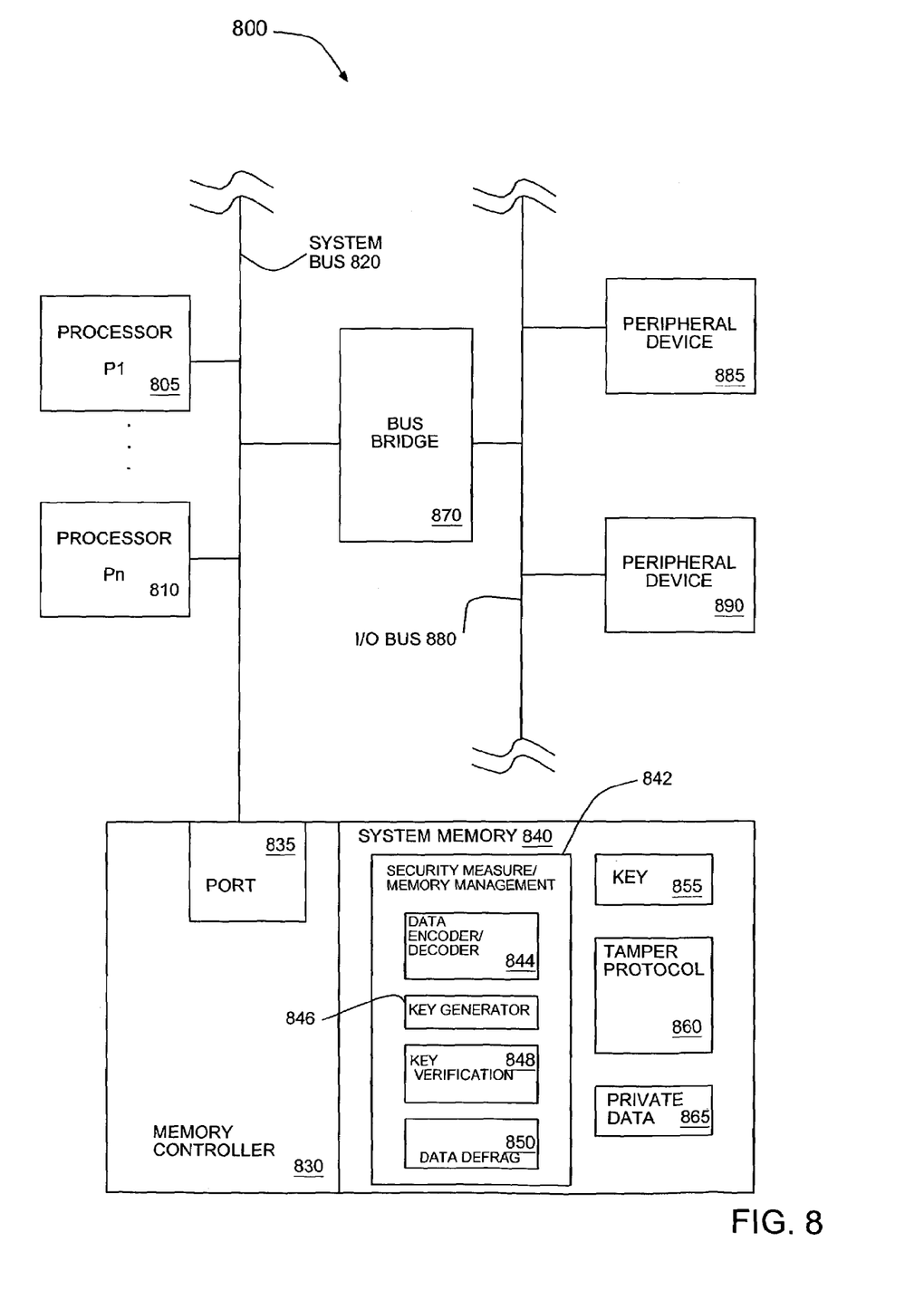
FIG. 8 depicts an embodiment of a data processing system according to the present invention.

FIG. 8 depicts one embodiment of a data processing system according to the present invention. Data processing system 800 includes one or more processors P1 805 through Pn 810 coupled with system memory 840 via system bus 820 and memory controller 830. Processors P1 805 through Pn 810 may be implemented with any of a variety of general purpose microprocessors including, as examples, the Power PC® family of processors from IBM Corporation and x86 type processors such as the Pentium® family of processors from Intel Corporation. System memory 840 can be implemented with volatile storage elements such as an array of dynamic random access memory (DRAM) components. System memory 840 may also include read only memory (ROM) and nonvolatile read/write memory.

Memory controller 830 facilitates access to system memory 840. Memory controller 830 may include a processor such as a micro-controller, state machine, or the like to implement a security measure to determine tampering associated with system memory 840, during wait cycles of a port protocol associated with port 835 and execute a tampering protocol, wherein instructions to implement the security measure reside in security measure/memory management 824 and the instructions for execution of a tampering protocol reside in tampering protocol 860. Memory controller 830 may further implement memory management instructions of security measure/memory management 842. In alternative embodiments, logic and/or a state machine of memory controller 830 implement the security measure, manage memory, and/or execute a tampering protocol without accessing system memory 840, one or more processors of processors P1 805 through processor Pn 810 implement the security measure, manage memory, and/or execute a tampering protocol via system memory 840 and/or other memory such as firmware or cache coupled with or integrated with the processor(s). In a further embodiment, circuitry integrated in a processor such as processors P1 through Pn is configured to implement a security measure, manage memory, and/or execute a tampering protocol without accessing instructions stored in memory.

System memory 840 includes memory to store security measure/memory management 842, key 855, tamper protocol 860, and private data 865. In the present embodiment, security measure/memory management 842 includes data encoder/decoder 844, key generator 846, key verification 848, and data defragmentation 850. Data encoder/decoder 844 facilitates coding data such as private data 865 received via port 835. For example, memory controller 830 receives data in a transaction from a peripheral device 890. The transaction may include an identification (ID) such as a source ID or other ID to indicate that the data of the transaction is private data. In an alternative embodiment, the transaction includes a write associated with an address associated with private data 865. After determining that the data is private data, memory controller 830 implements data encoder/decoder 844 to encrypt the data and store the encrypted data in private data 865. In these alternative embodiments, an encryption key may be stored in key 855.

Key generator 846 includes instructions to generate a key such as a checksum of data in system memory 840. In the present embodiment, for instance, after the data of a transaction is encrypted via data encoder/decoder 844, memory controller 830 executes instructions of key generator 846 to generate a checksum of the encrypted data and store the checksum in key 855. In an alternative embodiment, storing a checksum at an address or logical address within key 855 associates the checksum with the corresponding data of system memory 840. In other embodiments, data may be stored along with the checksum to associate the checksum with the data.

Key verification 848 facilitates a comparison between data stored in system memory 840 and a checksum stored in key 855. In particular, during wait cycles or idle cycles of port 835, memory controller 830 executes instructions of key verification 848 to verify that data having keys such as checksums in key 855 remain substantially the same. For example, memory controller 830 may generate a checksum via key generator 846 for data in system memory 840 and compare the checksum to a prior checksum stored in key 855. If the new checksum is the same as the prior checksum, memory controller 830 considers the data to be unchanged. On the other hand, if the new checksum differs from the prior checksum, memory controller 830 executes a tamper protocol via tamper protocol 860 to prevent further tampering with the content of system memory 840.

Data defrag 850 facilitates defragmentation of fragmented data stored in system memory 840 via memory controller 830. For instance, data stored in system memory 840 may include logical addresses associated with physical addresses of system memory 840 by a look-up table. After receiving a transaction to access data of system memory 840, memory controller 830 may determine the physical address of the memory via the look-up table. During wait cycles or idle cycles of a port protocol associated with port 835, memory controller 830 may begin to defrag data in system memory 840 and modify the look-up table accordingly. When defragmentation does not complete during the currently available wait cycles, defragmentation may resume during a subsequent set of wait cycles.

Tamper protocol 860 provides instructions designed to prevent improper access to private data 865. Tamper protocol 860 may include instructions to block transactions via port 835 by disabling a port protocol for transactions and enabling a trusted-device port protocol, wherein the trusted-device port protocol provides access to system memory 840 by another device operating a trusted-device port protocol. In many embodiments, the port protocol disabled includes a port protocol for accessing private data 865 and alternative port protocols continue to provide access to portions of system memory 840 such as portions other than security measure/memory management 842, key 855, tamper protocol 860, and private data 865.

Bus bridge 870 provides an interface between system bus 820 and a peripheral bus, referred to as I/O bus 880. I/O bus 880 may be implemented according to an industry standard peripheral bus protocol or specification such as the Peripheral Components Interface (PCI) protocol as specified in PCI Local Bus Specification Rev 2.2, from the PCI Special Interest Group (www.pcisig.org). Data processing system 800 may include one or more peripheral devices 885 and 890 connected to I/O bus 880. These peripheral devices 885 and 890 could include, for example, a hard disk controller, a network interface adapter, a graphics adapter, and the like.

Figure 9:
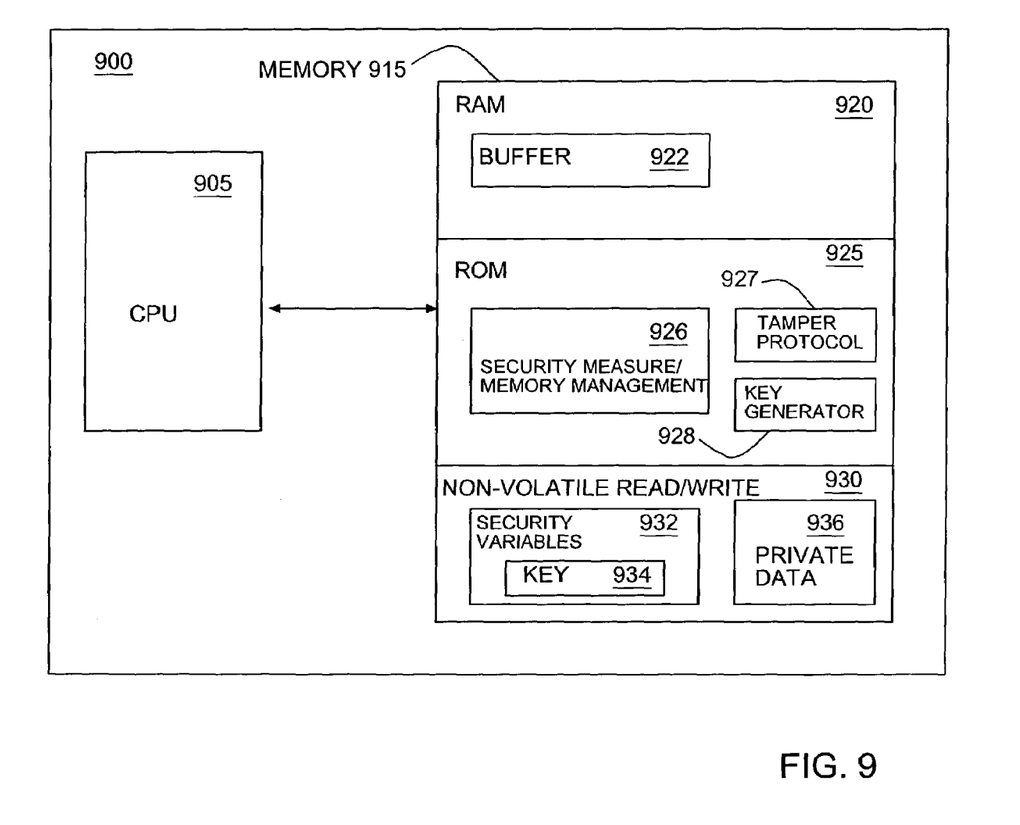
FIG. 9 depicts an embodiment of a smart card according to the present invention.

FIG. 9 conceptually illustrates as one example of a data processing system of the invention, an embodiment of a microprocessor with integral memory element for a smart card. Microprocessor 900 includes central processing unit (CPU) 905. CPU 905 is coupled with a memory 915. Memory 915 may be formed on the same integrated circuit as microprocessor 900 or on a separate device. Generally, memory element 915 is configured to include random access memory (RAM) 920, read only memory (ROM) 925, and non-volatile read/write memory 930. RAM may comprise buffer 922 to store port protocol variables and security variables as well as to prepare to receive a command and to facilitate implementation of a security measure during wait cycles.

ROM 925 is configured to include security measure/memory management 926 to implement a security measure and/or manage memory 915, tamper protocol 927 to prevent improper access to private data 936, and key generator 928 to generate a key based upon private data as initially received. In an alternative configuration, RAM 920, ROM 925, and non-volatile read/write memory 930 are not located in the same memory element 915, but rather, in some combination of separate electronic units. Memory such as RAM, EEPROM, flash, or any other type of erasable memory, which can possibly come under attack to modify the data contained therein can be subject to a security measure to provide some assurance that private data stored on the smart card is safe from improper access gained by these types of tampering.

Security measure/memory management 926 facilitates monitoring the contents or targeted contents of memory 915 to determine when tampering occurs and tamper protocol 927 facilitates blocking such an attempt after detection with little impact to current smart cards by implementing security checks or verifications during wait cycles of a port protocol wherein the processor of the smart card has available bandwidth. Further, memory management during wait cycles can improve the performance of the smart card with regards to storing and retrieving data, particularly data residing in slower memory types such as flash and EEPROM.

Key generator 928 involves generating a key to implement a security measure such as a checksum, CRC, DES encryption, and the like. For instance, key generator 928 may determine a key for data received and store the key in key 934 of security variables 932. Then, during implementation of the security measure, CPU 905 may generate the same type of key for the data via key generator 928 to facilitate a comparison of the current data and the data initially received.

Security variables 932 may comprise variables associated with implementation of a security measure during waiting cycles such as key 934 and other variables like the number of cycles spent with a comparison of a key generated from current data and the initial key generated when the data was received. In additional embodiments, security variables 932 comprises a chart to indicate the number of loops available to a security measure based upon the speed of the transmission and the associated port protocol.

It should be appreciated that portions of the present invention may be implemented as a set of machine executable instructions (software or the like) stored on or contained in a machine-readable medium. A machine-readable medium includes any mechanism that provides (i.e., stores and/or transmits) information in a form readable by a machine (e.g., a computer), that when executed by the machine, may perform the functions described herein. For example, a machine-readable medium may include read only memory (ROM); random access memory (RAM); magnetic disk storage media; optical storage media (e.g., CD ROM, DVD, and the like); flash memory devices; electrical, optical, acoustical or other form of propagated signals (e.g. carrier waves, infrared signals, digital signals, etc.); etc. Several embodiments of the present invention may include more than one machine-readable medium depending on the design of the machine.

Source code for an alternative embodiment of the invention is included as in Appendix A to this disclosure. As introduced above, the term "smart card" was described with reference to the device shown in FIG. 1. Secure Interface Modules (SIMs) and Secure Access Modules (SAMs), however, are physically smaller versions of the typical smart card and are typically used within telephones or other small spaces. As used herein, the term "smart card" is not intended to be limited by the size, shape, nature, and composition of the material encapsulating or mounting the microprocessor and memory element. Thus, as used throughout, the term "smart card" is to be broadly read as encompassing any self-contained combination of microprocessor and memory element capable of processing data.

It will be apparent to those skilled in the art having the benefit of this disclosure that the present invention contemplates an apparatus, data processing system, method, and machine-readable medium to utilize wait cycles of a communication interface to enhance data integrity and security. It is understood that the following claims of the invention shown and described in the detailed description and the drawings are to be taken merely as examples and that the invention is limited only by the language of the claims.

APPENDIX A

SOURCE CODE

Modified Driver for ISO 7816 Communication

---

```
RSEG CODE
__OSX__Receive:
    //----------------------------
    // Preload bit sampling time
        // Delay for 0.5 etu
        //----------------------------
    LOAD    Delay, HalfETU
    //--------------------------------
    // Load Protocol options in RAM
    //--------------------------------
    LOAD    ProtocolFlags,ProtocolOption
    //-----------------------------------
    // Initialise the repeat counter
    //-----------------------------------
    LOADI   repeat_counter,3
    //---------------------------------------
    // Loops until an interrupt is received
    //---------------------------------------
    LOADI receive_status,1   // SECU: Set the receive status flag.
Loop:
SecurityChecks:
        CALLFUNC __OSX__CheckSecurity   // Call C function that does the
security check.
        BRNSTS   InLoop   // If the byte has been received successfully
            // the ISR will clear the receive_status and return
    RETURN              // the data
/*
* (©) Copyright Schlumberger Technology Corp., unpublished
* work. This computer program includes
* Confidential, Proprietary Information and is a Trade Secret
* of Schlumberger Technology Corp. All use, disclosure, and/or
* reproduction is prohibited unless authorized in writing.
* All Rights Reserved.
*
*/
#include "chipdef.h"
/* Flash */
#define FLASH_MEMORY       0
#define FLASH_SIZE         (FLASH_TOP_ADDRESS -
FLASH_BASE_ADDRESS)
#define FLASH_PAGE_SIZE    0x80
#define NUM_FLASH_MEMORY_UNITS    16
#define SIZEOF_FLASH_MEMORY_UNIT  (FLASH_SIZE+1) /
NUM_FLASH_MEMORY_UNITS
/* EEPROM */
#define EEPROM_MEMORY             1
#define EEPROM_SIZE               (EEPROM_BASE_ADDRESS -
EEPROM_TOP_ADDRESS)
#define EEPROM_PAGE_SIZE          0x80
#define NUM_EEPROM_MEMORY_UNITS   16
#define SIZEOF_EEPROM_MEMORY_UNIT (EEPROM_SIZE+1) /
NUM_EEPROM_MEMORY_UNITS
#define SECURITY_STRUCTURE_SIZE
(EEPROM_SIZE/EEPROM_PAGE_SIZE + FLASH_SIZE/FLASH_PAGE_SIZE)
typedef struct {
    BYTE MemoryType;
    WORD MemoryUnitAddress;
    WORD checkSumInitValue;
    WORD checkSumPresentValue;
} SECURITY_STRUCTURE;
#ifdef_IAR
#pragma memory = dataseg(EEPEND)
#endif
SECURITY_STRUCTURE_SEEPROM
SecurityStructure[SECURITY_STRUCTURE_SIZE];
BYTE _SEEPROM lastFlashMUVerified;
BYTE _SEEPROM lastEepromMUVerified;
#ifdef_IAR
#pragma memory = default
#endif
WORD CheckSum;
```

-continued

```
SECURITY_STRUCTURE* pSecurityStructure;
/*
* (©) Copyright Schlumberger Technology Corp., unpublished
* work. This computer program includes
* Confidential, Proprietary Information and is a Trade Secret
* of Schlumberger Technology Corp. All use, disclosure, and/or
* reproduction is prohibited unless authorized in writing.
* All Rights Reserved.
*
*/
#include <gpos.h>
#include <security.h>
#include <at90_mgr.h>
WORD __OSX_ComputeCheckSum(INDEX ibuffer, WORD wlength, BYTE
memArea) {
    BYTE i,bEepSize;
    /* Calculate the checksum */
    if (memArea == FLASH_MEMORY) {
        for(i=0;i<wlength;wlength=+2)
            CheckSum ^= __LOAD ((void flash*)((short)VIRTUAL_ADDRESS(ibuffer)));
    }
    else if (memArea == EEPROM_MEMORY) {
        __OSX_CopyBuffer(ibuffer,SYS_EepromWriteBuffer,wlength);
        for (bEepSize = 0; bEepSize<wlength; bEepSize=+2)
            CheckSum ^= *((WADDRESS)(SYS_EepromWriteBuffer+bEepSize));
    }
    return(CheckSum);
}
void __AT90_InitSecurityStructure(void) {
BYTE loop, wCheckSum;
    /* Init the CheckSum Values */
    for (loop = 1;loop<NUM_FLASH_MEMORY_UNITS;loop++) {
        __OSX_WriteByte(&pSecurityStructure->MemoryType,FLASH_MEMORY);
        __OSX_WriteWord((INDEX)pSecurityStructure->MemoryUnitAddress,
(WORD)SIZEOF_FLASH_MEMORY_UNIT);
        wCheckSum = __OSX_ComputeCheckSum((INDEX)pSecurityStructure-
>MemoryUnitAddress, SIZEOF_FLASH_MEMORY_UNIT, FLASH_MEMORY);
        __OSX_WriteByte(VIRTUAL_INDEX(lastFlashMUVerified), loop);
    }
    for (loop = 1;loop<NUM_EEPROM_MEMORY_UNITS;loop++) {
        __OSX_WriteByte(&pSecurityStructure->MemoryType,EEPROM_MEMORY);
        __OSX_WriteWord((INDEX)pSecurityStructure->MemoryUnitAddress,
(WORD)SIZEOF_EEPROM_MEMORY_UNIT);
        wCheckSum = __OSX_ComputeCheckSum((INDEX)pSecurityStructure-
>MemoryUnitAddress, SIZEOF_FLASH_MEMORY_UNIT, EEPROM_MEMORY);
        __OSX_WriteByte(VIRTUAL_INDEX(lastEepromMUVerified), loop);
    }
}
SCSTATUS __OSX_CheckSecurity(void) {
BYTE loop, wCheckSum;
    /* Verify CheckSum */
    for (loop =
__OSX_ReadByte(VIRTUAL_INDEX(lastFlashMUVerified));loop<NUM_FLASH_MEM
ORY_UNITS;loop++) {
        wCheckSum = __OSX_ComputeCheckSum((INDEX)pSecurityStructure-
>MemoryUnitAddress, SIZEOF_FLASH_MEMORY_UNIT, FLASH_MEMORY);
        if(pSecurityStructure->checkSumInitValue != wCheckSum)
            return 1;
    }
    for (loop
=__OSX_ReadByte(VIRTUAL_INDEX(lastEepromMUVerified));loop<NUM_EEPROM
_MEMORY_UNITS;loop++) {
        wCheckSum = __OSX_ComputeCheckSum((INDEX)pSecurityStructure-
>MemoryUnitAddress, SIZEOF_FLASH_MEMORY_UNIT, EEPROM_MEMORY);
        if(pSecurityStructure->checkSumInitValue != wCheckSum)
            return 1;
    }
    return (ST_SUCCESS);
}
```

What is claimed is:

1. A method of operating a device connected to a terminal, the method for taking advantage of wait cycles encountered between transmitted characters in a message received on a port, the method comprising:
receiving characters of a transmitted message from the terminal timed according to a reference clock;
operating a processor clock that is faster than the reference clock used for processing transactions with a terminal to which the device is connected;
processing each character of a message in a subset of processor clock cycles that correspond to one reference clock cycle such that the processor has wait cycles for each clock cycle of the reference clock;
performing a memory management task during the additional clock cycles encountered between characters transmitted as part of a message according to a port protocol, comprising:
executing a security measure to determine tampering associated with a memory during wait cycles encountered between characters transmitted as part of a message according to a port protocol, wherein the port protocol facilitates access to the memory; and
executing a tamper protocol in response to a determination of tampering to prevent an improper access to the memory.

2. The method of claim 1, wherein managing the memory comprises accessing the memory to reduce fragmentation of data after receipt of a character of a command via the port protocol and prior to receiving a subsequent character via the port protocol.

3. The method of claim 1, wherein the implementing a security measure comprises determining a key based upon a content of the memory.

4. The method of claim 3, wherein determining a key comprises determining a checksum.

5. The method of claim 3, wherein determining a key comprises encoding the content.

6. The method of claim 3, wherein the implementing a security measure comprises verifying the content based upon the key after responding to a command received via the port protocol and prior to receiving a subsequent command via the port protocol.

7. The method of claim 3, wherein the implementing a security measure comprises verifying the content based upon the key after receipt of a character of a command received via the port protocol and prior to receiving a subsequent character via the port protocol.

8. The method of claim 1, wherein the implementing a security measure comprises comparing a checksum associated with a content of the memory against a reference checksum associated with the content.

9. The method of claim 1, wherein the executing a tamper protocol comprises disabling the port protocol in response to the determination of tampering.

10. A data processing system configured to execute computer code having a plurality of transactions within the computer code and to take advantage of wait cycles between transmitted characters in a message received on a port, the data processing system comprising:
a memory to store private data;
a processor coupled with the memory and operating according to a processor clock;
a port coupled with the processor and operating according to a reference clock, wherein the reference clock is slower than the processor clock; and
having logic to cause the processor to
process each character of a message in a subset of processor clock cycles that correspond to one reference clock cycle such that the processor clock has wait cycles for each clock cycle of the reference clock;
perform a memory management task during the additional clock cycles encountered between characters transmitted as part of a message according to a port protocol, comprising logic to:
implement a security measure to determine tampering associated with the memory during the wait cycle encountered between characters transmitted as part of a message according to a port protocol, wherein the port protocol facilitates access to the memory; and
execute a tamper protocol in response to a determination of tampering to prevent an improper access to the memory.

11. The data processing system of claim 10, wherein the logic to cause the processor to manage the memory comprises logic to access the memory to reduce fragmentation of data after receipt of a character of a command via the port protocol and prior to receiving a subsequent character of a command via the port protocol.

12. The data processing system of claim 10, wherein the logic to cause the processor to implement a security measure comprises logic to determine a key based upon a content of the memory.

13. The data processing system of claim 12, wherein the logic to determine a key comprises logic to determine a checksum.

14. The data processing system of claim 12, wherein the logic to determine a key comprises logic to encode the content.

15. The data processing system of claim 12, wherein the logic to cause the processor to implement a security measure comprises logic to verify the content based upon the key after responding to a command received via the port protocol and prior to receiving a subsequent command via the port protocol.

16. The data processing system of claim 12, wherein the logic to cause the processor to implement a security measure comprises logic to verify the content based upon the key after receipt of a character of a command received via the port protocol and prior to receiving a subsequent character via the port protocol.

17. The data processing system of claim 10, wherein the logic to cause the processor to implement a security measure comprises logic to compare a checksum associated with a content of the memory against a reference checksum associated with the content of the memory.

18. The data processing system of claim 10, wherein the logic to cause the processor to execute a tamper protocol comprises logic to disable the port protocol in response to the determination of tampering.

19. A machine-readable medium storing a program of machine-readable instructions for causing a processor connected to a terminal to perform a method for taking advantage of wait cycles between transmitted characters in a message received on a port, the method comprising:
receiving characters of a transmitted message from the terminal timed according to a reference clock;
operating a processor clock that is faster than the reference clock used for processing transactions with a terminal to which the device is connected;
processing each character of a message in a subset of processor clock cycles that correspond to one reference clock cycle such that the processor clock has wait cycles for each clock cycle of the reference clock;

performing a memory management task during the additional clock cycles encountered between characters transmitted as part of a message according to a port protocol, comprising:

implementing a security measure to determine tampering associated with memory during a wait cycle encountered between characters transmitted as part of a message according to a port protocol, wherein the port protocol facilitates access to the memory; and     executing a tamper protocol in response to a determination of tampering to prevent an improper access to the memory.

20. The machine-readable medium of claim 19, wherein managing the memory comprises accessing the memory to reduce fragmentation of data after receipt of a character of a command via the port protocol and prior to receiving a subsequent character via the port protocol.

21. The machine-readable medium of claim 19, wherein the implementing a security measure comprises determining a key based upon a content of the memory.

22. The machine-readable medium of claim 21, wherein determining a key comprises determining a checksum.

23. The machine-readable medium of claim 21, wherein determining a key comprises encoding the content.

24. The machine-readable medium of claim 21, wherein the implementing a security measure comprises verifying the content based upon the key after responding to a command received via the port protocol and prior to receiving a subsequent command via the port protocol.

25. The machine-readable medium of claim 21, wherein the implementing a security measure comprises verifying the content based upon the key after receipt of a character of a command received via the port protocol and prior to receiving a subsequent character via the port protocol.

26. The machine-readable medium of claim 19, wherein the implementing a security measure comprises comparing a checksum associated with a content of the memory against a reference checksum associated with the content of the memory.

27. The machine-readable medium of claim 19, wherein the executing a tamper protocol comprises disabling the port protocol in response to the determination of tampering.

* * * * *